US009946261B2

(12) United States Patent
Riski (10) Patent No.: US 9,946,261 B2
(45) Date of Patent: Apr. 17, 2018

(54) USER-OPERABLE CONTROL FOR PROPULSION SYSTEMS (71) Applicant: Norsepower Oy, Helsinki (FI)

(72) Inventor: Tuomas Riski, Helsinki (FI)

(73) Assignee: Norsepower Oy, Helsinki (FI)

( * ) Notice: Subject to any disclaimer, the term of this patent is extended or adjusted under 35 U.S.C. 154(b) by 54 days.

(21) Appl. No.: 14/897,307

(22) PCT Filed: Jun. 16, 2014

(86) PCT No.: PCT/FI2014/000012
§ 371 (c)(1),
(2) Date: Dec. 10, 2015

(87) PCT Pub. No.: WO2015/001172
PCT Pub. Date: Jan. 8, 2015

(65) Prior Publication Data
US 2016/0147228 A1 May 26, 2016

(30) Foreign Application Priority Data
Jul. 4, 2013 (GB) .................................. 1312054.8

(51) Int. Cl.
B63B 35/00 (2006.01)
G05D 1/02 (2006.01)
(Continued)

(52) U.S. Cl.
CPC ............. G05D 1/0206 (2013.01); B63H 1/02 (2013.01); B63H 9/02 (2013.01); B63H 21/213 (2013.01);
(Continued)

(58) Field of Classification Search
CPC ............ B63H 9/02; B63B 15/00; B63B 35/00
(Continued)

(56) References Cited

U.S. PATENT DOCUMENTS 4,602,584 A * 7/1986 North ....................... B63H 9/02
114/39.3
7,966,777 B2 * 6/2011 Douglas ................. E04H 12/182
52/110
(Continued)

FOREIGN PATENT DOCUMENTS

DE 102010040903 A1 3/2012
DE 102010040920 A1 3/2012
WO 2012178006 A2 12/2012

OTHER PUBLICATIONS

International Search Report for PCT No. PCT/FI2014/000012, dated Oct. 10, 2014, 12 pages.
GB Search Report for GB1312054.8, dated Nov. 20, 2013, 1 page.

Primary Examiner — Thomas G Black
Assistant Examiner — Wae L Louie
(74) Attorney, Agent, or Firm — Ziegler IP Law Group, LLC (57) ABSTRACT A propulsion system for an aquatic vessel is provided. The propulsion system includes a plurality of Magnus-type rotors and a drive arrangement for rotating the plurality of Magnus-type rotors. The plurality of Magnus-type rotors are operable to rotate about corresponding substantially upright axes. The propulsion system also includes a control arrangement for receiving one or more measured apparent wind speeds and for controlling the drive arrangement to vary rates of rotations of the plurality of Magnus-type rotors. The rates of rotations may, for example, be varied as functions of the measured apparent wind speeds and a direction of travel of the aquatic vessel. Moreover, the control arrangement includes a user-operable control for adjusting propulsion provided by the plurality of Magnus-type rotors. The control arrangement is operable to control the drive arrangement to vary a drive applied to rotate one or more Magnus-type rotors from the plurality of Magnus-type rotors.

13 Claims, 6 Drawing Sheets (51) Int. Cl.
*B63H 9/02* (2006.01)
*B63H 21/21* (2006.01)
*B63H 1/02* (2006.01)
*B63H 1/00* (2006.01)

(52) U.S. Cl.
CPC ......... *B63H 2001/005* (2013.01); *Y02T 70/58* (2013.01)

(58) Field of Classification Search
USPC ................. 114/39.3, 90, 102.29; 701/22
See application file for complete search history.

(56) References Cited

U.S. PATENT DOCUMENTS

| | | | |
|---|---|---|---|
| 8,261,681 B2* | 9/2012 | Wobben | B63H 9/02 114/39.3 |
| 8,746,162 B2* | 6/2014 | Holohan | B63H 9/02 114/102.29 |
| 2002/0139284 A1* | 10/2002 | Iacoboni | B63B 15/0083 114/90 |
| 2009/0241820 A1* | 10/2009 | Rohden | B63H 9/02 114/39.3 |
| 2013/0220191 A1 | 8/2013 | Rohden | |
| 2013/0291775 A1 | 11/2013 | Wobben | |

* cited by examiner

USER-OPERABLE CONTROL FOR PROPULSION SYSTEMS

CROSS-REFERENCE TO RELATED APPLICATION(S)

This application is related to U.K. Patent Application Serial No. GB 1312053.0 filed on 4 Jul. 2013 entitled "Propulsion System for Aquatic Vessels" and incorporated by reference in its entirety.

TECHNICAL FIELD

The present invention generally relates to propulsion systems for aquatic vessels, and more specifically, to propulsion systems that use Magnus-type rotors for propelling aquatic vessels. Moreover, the present invention relates to methods of controlling the propulsion systems for the aquatic vessels. Furthermore, the present invention also relates to software products recorded on non-transitory machine-readable data storage media, wherein the software products are executable upon computing hardware to implement the aforesaid methods.

BACKGROUND

Today, marine industry is making new attempts to harvest wind power to propel aquatic vessels. Typically, a conventional propulsion system for an aquatic vessel includes one or more propellers for propelling the aquatic vessel, and multiple Magnus rotors for supplementing the propellers. The Magnus rotors rotate about corresponding substantially upright axes to produce a Magnus effect to propel the aquatic vessel. The Magnus effect may be defined as a thrust acting on a rotating body in a moving airstream, such as wind, wherein the thrust acts perpendicularly to a direction of the moving airstream.

A crew of the aquatic vessel needs to control operations of the propellers and the Magnus rotors to produce propulsion power required for propelling the aquatic vessel. The required propulsion power may change during a course of a journey of the aquatic vessel. Accordingly, the propulsion power may be generated by the propellers alone, by the Magnus rotors alone, or by the propellers and the Magnus rotors together, depending on various factors. For example, in a harbour or other narrow regions, the aquatic vessel may be manoeuvred using the propellers alone, as wind conditions may not be favourable for the Magnus rotors. While in high seas, the aquatic vessel may be propelled using the Magnus rotors alone, to save fuel.

Moreover, thrusts generated by the Magnus rotors depend on rates and directions of rotations of the Magnus rotors relative to an apparent speed and an apparent direction of wind. Apparent wind conditions change regularly during the course of the journey of the aquatic vessel. Moreover, the apparent wind conditions may be different in different portions of the aquatic vessel. Therefore, the rates of rotations of the Magnus rotors need to be adjusted repeatedly with changing apparent wind conditions in order to maximise propulsion from the Magnus rotors. This may pose additional problems for the crew of the aquatic vessel, who may already find it difficult to control the conventional propulsion system with ever-changing requirements of the aquatic vessel.

The terms "apparent wind speed" and "apparent wind direction" refer to wind speed and direction as observed from an aquatic vessel in motion. In case when the aquatic vessel is stationary, the apparent wind speed and the apparent wind direction are the same as the wind speed and the wind direction in relation to Earth or a fixed object. Measurement of the apparent wind speed can be done technically by employing an anemometer and/or other wind sensors. The wind speed and direction in respect to the fixed object or Earth can be calculated from the measured apparent wind by taking in account a speed and a direction of the aquatic vessel.

In light of the foregoing discussion, there exists a need for a propulsion system for an aquatic vessel that enables a user to control complex operations of the propulsion system in an effective manner, as compared to known conventional propulsion systems.

BRIEF SUMMARY

The present disclosure seeks to provide a propulsion system for an aquatic vessel.

The present disclosure also seeks to provide a method of controlling a propulsion system for an aquatic vessel.

In one aspect, embodiments of the present disclosure provide a propulsion system for an aquatic vessel. The propulsion system includes a plurality of Magnus-type rotors and a drive arrangement for rotating the plurality of Magnus-type rotors. The plurality of Magnus-type rotors are operable to rotate about corresponding substantially upright axes, thereby producing a Magnus effect to propel the aquatic vessel. The Magnus effect may be defined as a thrust acting on a rotating body in a moving airstream, such as wind, wherein the thrust acts perpendicularly to a direction of the moving airstream.

The propulsion system also includes a control arrangement for receiving one or more measured apparent wind speeds and for controlling the drive arrangement to vary rates of rotations of the plurality of Magnus-type rotors. The rates of rotations may, for example, be varied as functions of the measured apparent wind speeds and a direction of travel of the aquatic vessel.

Additionally, the control arrangement is operable to receive one or more measured apparent wind directions, and take into account the measured apparent wind directions when controlling the drive arrangement for varying directions of rotations of the plurality of Magnus-type rotors.

Moreover, the control arrangement includes a user-operable control for adjusting propulsion provided by the plurality of Magnus-type rotors. The user-operable control is implemented as a single throttle control that enables a user to control and/or allocate a total propulsion power demand from the plurality of Magnus-type rotors.

Moreover, the control arrangement may be operable to compute rates of rotations to be adjusted for the plurality of Magnus-type rotors individually, based on the total propulsion power demand from the plurality of Magnus-type rotors and one or more apparent wind speeds in proximities of the plurality of Magnus-type rotors.

Moreover, the control arrangement is operable to control the drive arrangement to vary a drive applied to rotate one or more Magnus-type rotors from the plurality of Magnus-type rotors. The control arrangement is then operable to optimize the drive for these Magnus-type rotors depending on a control input provided by the user via the single throttle control.

In accordance with a specific embodiment of the present disclosure, the drive arrangement may be operable to apply the drive to rotate the Magnus-type rotors in order to render the Magnus-type rotors at least partially invisible to the one or more apparent wind speeds by adjusting their respective rates of rotations, such that their surface-to-flow velocity ratio is substantially unity. One example of a surface-to-flow velocity ratio range for making the Magnus-type rotors at least partially invisible is 0.3 to 1.5. Preferably the range is 0.8 to 1.2. The term "surface-to-flow velocity ratio" refers in this disclosure a value corresponding to rotors circumference D (in meters) multiplied by the rotation speed V_rot (1/sec) of the rotor divided by apparent wind speed V_apparent (meter/sec) (ratio=D×V_rot/V_apparent).

As a further example the present disclosure may also be used to prevent wear of the bearings of the Magnus-type rotor due to false brinnelling. False brinnelling can be avoided for example by rotating the Magnus-type rotor slowly instead of keeping it stationary. One example of surface-to-flow velocity ratio range for avoiding false brinnelling is from greater than 0 to 1.5. For example preferably range can be 0.00001 to 1.5.

As a further example the present disclosure may also be used to prevent vortex shedding phenomena on the stationary rotor. The vortex shedding phenomena results on vibrations on the structures. If those match any structural eigenfrequencies of the rotor itself, or the foundation or any related structure it might result to problems. Choosing a proper surface to velocity ratio at different wind conditions this problem can be avoided. Example range is from 0.1 to 2.0, preferably 0.5 to 1.5

Furthermore, the user-operable control may be implemented via a Graphical User Interface (GUI) provided on one or more pixel displays. Beneficially, at least one pixel display from these pixel displays may be implemented as at least one touch-screen display.

Additionally, the GUI or a part of the GUI may be implemented via a portable device that includes at least one touch-screen display and/or physical buttons.

Optionally, the user-operable control may be operable to receive the control input via one or more swiping gestures of the user on the single throttle control.

Optionally, the user-operable control may be operable to receive one or more control inputs via one or more circular gestures of the user on the at least one touch-screen display. This potentially enables the user to control each of the plurality of Magnus-type rotors individually.

In another aspect, embodiments of the present disclosure provide a method of controlling the propulsion system.

In yet another aspect, embodiments of the present disclosure provide a software product recorded on non-transitory machine-readable data storage media, wherein the software product is executable upon computing hardware for implementing the method of controlling the propulsion system.

Embodiments of the present disclosure substantially eliminate the aforementioned problems in the prior art, and enable the user to control and/or monitor various operations of the control arrangement in an effective manner, and allow the user to control complex operations of various components of the propulsion system with ease, such that even an untrained user may be able to operate the user-operable control.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which it can be implemented. Although the best mode of carrying out the present disclosure has been disclosed, those in the art would recognize that other embodiments for carrying out or practicing the present disclosure are also possible.

Embodiments of the present disclosure provide a propulsion system for an aquatic vessel. The propulsion system includes a plurality of Magnus-type rotors and a drive arrangement for rotating the plurality of Magnus-type rotors. The plurality of Magnus-type rotors are operable to rotate about corresponding substantially upright axes, thereby producing a Magnus effect to propel the aquatic vessel. The Magnus effect may be defined as a thrust acting on a rotating body in a moving airstream, such as wind, wherein the thrust acts perpendicularly to a direction of the moving airstream.

The propulsion system also includes a control arrangement for receiving one or more measured apparent wind speeds and for controlling the drive arrangement to vary rates of rotations of the plurality of Magnus-type rotors. The rates of rotations may, for example, be varied as functions of the measured apparent wind speeds and a direction of travel of the aquatic vessel.

Additionally, the control arrangement is operable to receive one or more measured apparent wind directions, and take into account the measured apparent wind directions when controlling the drive arrangement for varying directions of rotations of the plurality of Magnus-type rotors.

Additionally, the control arrangement may be operable to compute rates of rotations to be adjusted for the plurality of Magnus-type rotors individually, based on a total propulsion power demand from the plurality of Magnus-type rotors and one or more apparent wind speeds in proximities of the plurality of Magnus-type rotors.

Moreover, the control arrangement is operable to control the drive arrangement to vary a drive applied to rotate one or more Magnus-type rotors from the plurality of Magnus-type rotors. The control arrangement is then operable to optimize the drive for these Magnus-type rotors.

In accordance with a specific embodiment of the present disclosure, the drive arrangement may be operable to apply the drive to rotate the Magnus-type rotors in order to render the Magnus-type rotors at least partially invisible to the one or more apparent wind speeds by adjusting their respective rates of rotations, such that their surface-to-flow velocity ratio is substantially unity. One example of a surface-to-flow velocity ratio range for making the Magnus-type rotors at least partially invisible is 0.3 to 1.5. Preferably the range is 0.8 to 12. The term "surface-to-flow velocity ratio" refers in this disclosure value corresponding to rotors circumference D (in meters) multiplied by the rotation speed V_rot (1/sec) of the rotor divided by apparent wind speed V_apparent (meter/sec) (ratio=D×V_rot/V_apparent).

As a further example the present disclosure may also be used to prevent wear of the bearings of the Magnus-type rotor due to false brinnelling. False brinnelling can be avoided for example by rotating the Magnus-type rotor slowly instead of keeping it stationary. One example of surface-to-flow velocity ratio range for avoiding false brinneling is from greater than 0 to 1.5. Preferably range can be 0.00001 to 1.5.

As a further example the present disclosure may also be used to prevent vortex shedding phenomena on the stationary rotor. The vortex shedding phenomena results on vibrations on the structures. If those matches any structural eigenfrequencies of the rotor itself, or the foundation or any related structure it might result to problems. Choosing a proper surface to velocity ratio at different wind conditions this problem can be avoided. Example range is from 01 to 2.0, preferably 0.5 to 1.5

Moreover, the control arrangement includes a user-operable control for adjusting propulsion provided by the plurality of Magnus-type rotors. The user-operable control enables a user to control and/or monitor various operations of the control arrangement. For example, the user-operable control may enable the user to adjust at least one of: the rates of rotations of the Magnus-type rotors, the directions of rotations of the Magnus-type rotors, the drive applied to rotate the Magnus-type rotors, and/or angular accelerations and/or decelerations of the Magnus-type rotors.

The user-operable control may be implemented via a Graphical User Interface (GUI) provided on one or more pixel displays. Beneficially, at least one pixel display from these pixel displays may be implemented as at least one touch-screen display.

Additionally, the GUI or a part of the GUI may be implemented via a portable device that includes at least one touch-screen display and/or physical buttons.

Optionally, the user-operable control may be operable to receive its control input via one or more circular gestures of the user.

Optionally, the user-operable control may be implemented as a single throttle control and/or a button control.

Embodiments of the present disclosure are suitable for aquatic vessels such as passenger ships, cargo ships, special-purpose ships, and boats, but not limited thereto.

Figure 1:
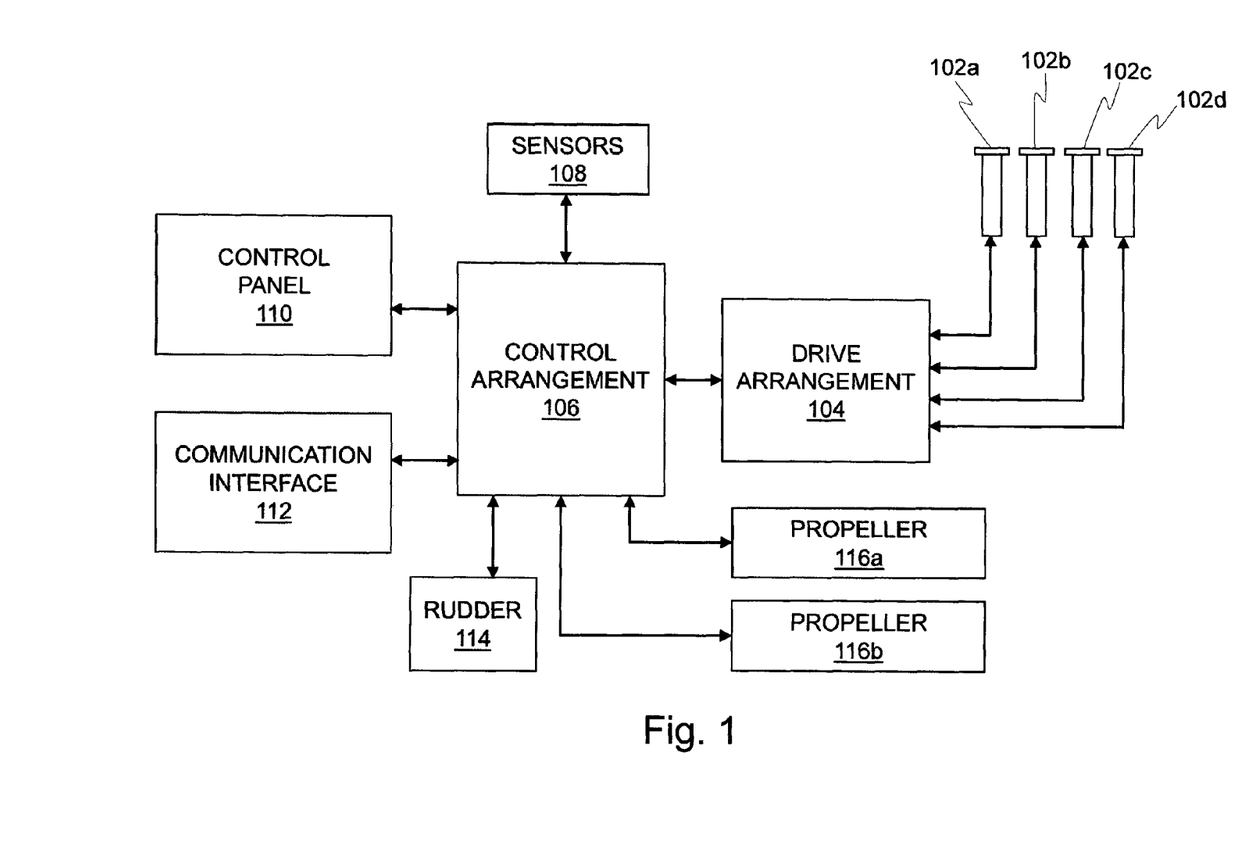
FIG. 1 is a schematic illustration of a propulsion system for an aquatic vessel, in accordance with an embodiment of the present disclosure.

Referring now to the drawings, particularly by their reference numbers, FIG. 1 is a schematic illustration of a propulsion system 100 for an aquatic vessel, in accordance with an embodiment of the present disclosure. The propulsion system 100 includes a plurality of Magnus-type rotors, depicted as a Magnus-type rotor 102a, a Magnus-type rotor 102b, a Magnus-type rotor 102c and a Magnus-type rotor 102d (hereinafter collectively referred to as Magnus-type rotors 102). The propulsion system 100 also includes a drive arrangement 104, a control arrangement 106, one or more sensors 108, a control panel 110, a communication interface 112, a rudder 114, and one or more propellers, depicted as a propeller 116a and a propeller 116b (hereinafter collectively referred to as propellers 116).

In order to perform their respective operations, various components of the propulsion system 100 may receive electricity from an electric grid (not shown in FIG. 1) of the aquatic vessel. Electricity may be typically generated by an engine (not shown in FIG. 1) of the aquatic vessel and stored in an energy storage arrangement coupled to the electric grid.

The Magnus-type rotors 102 may be spatially positioned at various portions of a deck of the aquatic vessel. For example, the Magnus-type rotors 102 may be spatially positioned in proximities of corners of the deck, namely, port and starboard sides of a bow and a stern of the aquatic vessel. Alternatively, the Magnus-type rotors 102 may be spatially positioned in proximity of a middle portion of the deck or the stern or the bow. The Magnus-type rotors 102 may be suitably positioned depending on, for example, a number of the Magnus-type rotors 102 that have been set up on the deck of the aquatic vessel, a size of the Magnus-type rotors 102, and/or a size and/or an aerodynamic shape of the aquatic vessel.

The drive arrangement 104 includes a plurality of drive units (not shown in FIG. 1) that are attached to the Magnus-type rotors 102. These drive units are operable to rotate the Magnus-type rotors 102 about their corresponding substantially upright axes. Beneficially, the drive arrangement 104 may include a drive unit corresponding to each of the Magnus-type rotors 102, so as to be operable to individually actuate the drive unit to vary a rate of rotations of its corresponding Magnus-type rotor independent of other Magnus-type rotors.

Optionally, the drive arrangement 104 may be operable to employ regenerative braking for the Magnus-type rotors 102, for example, when their rates of rotations are to be adjusted in operation. For example, power regenerated by deceleration of a Magnus-type rotor from the Magnus-type rotors 102 may be optionally transferred via the electric grid of the aquatic vessel, and used to accelerate another Magnus-type rotor from the Magnus-type rotors 102 and/or used to recharge the energy storage arrangement for future use in accelerating the Magnus-type rotors 102.

The drive arrangement 104 is coupled with the control arrangement 106, which is operable to control the drive arrangement 104 to vary rates of rotations of the Magnus-type rotors 102. The control arrangement 106 may, for example, be spatially implemented using one or more computing devices that include computing hardware, which are operable to execute one or more software products recorded on non-transitory machine-readable data storage media. Typical examples of the computing devices include, although are not limited to, a Personal Computer (PC), a handheld PC, a desktop computer, a laptop computer, a tablet computer, a phablet computer, an Ultra-Mobile Personal Computer (UMPC), and a smart telephone.

The control arrangement 106 is also coupled with the sensors 108. For this purpose, the control arrangement 106 may have a plurality of input and output ports to which the sensors 108 may be coupled, for example, using National Marine Electronics Association (NMEA) standards or other proprietary standards.

The sensors 108 may be operable to measure one or more sensor parameters. These sensor parameters may include one or more of:

(a) a rate of rotations of each of the Magnus-type rotors 102,
(b) a direction of rotations of each of the Magnus-type rotors 102,
(c) an angular acceleration and/or deceleration of each of the Magnus-type rotors 102,
(d) an orientation of the aquatic vessel,
(e) a drive applied by the drive arrangement 104 to rotate each of the Magnus-type rotors 102,
(f) a power consumed by the drive arrangement 104 to rotate each of the Magnus-type rotors 102,
(g) a thrust generated by each of the Magnus-type rotors,
(h) an apparent speed and/or an apparent direction of wind (hereinafter referred to as "apparent wind speed" and "apparent wind direction"),
(i) a speed and/or direction of travel of the aquatic vessel (hereinafter referred to as "vessel speed" and "vessel direction"), and/or
(j) a geographical location of the aquatic vessel (hereinafter referred to as "vessel location").

The sensors 108 may, for example, include one or more tachometers, one or more accelerometers, one or more gyroscopic sensors, one or more power consumption sensors, one or more strain gauges, one or more anemometers and/or one or more GPS sensors. Additionally, the sensors 108 may provide information from an electronic logbook of the aquatic vessel, and/or trim information of the aquatic vessel.

One or more sensors from amongst the sensors 108 may be spatially positioned on the Magnus-type rotors 102. While other sensors from amongst the sensors 108 may be spatially positioned in local proximities of the Magnus-type rotors 102, for example, to facilitate measurement of the apparent wind speed and the apparent wind direction in the local proximities of the Magnus-type rotors 102. This may be beneficial, for example, in cases where the aquatic vessel may be large, and the apparent wind speeds and/or the apparent wind directions may be different in various portions of the deck of the aquatic vessel.

The sensors 108 may be operable to generate one or more measurement signals corresponding to the sensor parameters. These measurement signals may include, inter alia, one or more measured apparent wind speeds, one or more measured vessel speeds, one or more measured apparent wind directions and one or more measured vessel directions. These measurement signals may, for example, be generated as a function of time. The sensors 108 may then be operable to send the corresponding measurement signals to the control arrangement 106.

Upon receiving the measurement signals, the control arrangement 106 may be operable to determine one or more wind speeds and/or one or more wind directions relative to Earth or a fixed object, from the measured apparent wind speeds, the measured vessel speeds, the measured apparent wind directions and the measured vessel directions, for example, using vector analysis.

Consequently, the control arrangement 106 is operable to control the drive arrangement 104 to vary the rate of rotations of each of the Magnus-type rotors 102. The rate of rotations may, for example, be varied as a function of the measured apparent wind speeds. In addition, the control arrangement 106 is operable to take into account the measured apparent wind directions when controlling the drive arrangement 104 for varying the direction of rotations of each of the Magnus-type rotors 102.

Moreover, the control arrangement 106 may be operable to compute a rate of rotations to be adjusted for each of the Magnus-type rotors 102 individually, based on a total propulsion power demand from the Magnus-type rotors 102 and apparent wind conditions (i.e., the apparent wind speeds and the apparent wind directions) in the local proximities of the Magnus-type rotors 102. For this purpose, the control arrangement 106 may be operable to use pre-calculated tables and/or curves for the Magnus-type rotors 102. Such pre-calculated tables and/or curves may provide an efficient rate of rotation corresponding to different apparent wind conditions and the total propulsion power demand from the Magnus-type rotors 102. Such pre-calculated tables and/or curves may also take into account maximum power available via the electric grid. A pre-calculated table and/or curve may, for example, be calculated using test data on various theoretical models, statistical models, simulated models or combinations thereof.

Furthermore, the control arrangement 106 may be operable to control the drive arrangement 104 to vary a drive applied to rotate one or more Magnus-type rotors from the Magnus-type rotors 102. The control arrangement 106 may then be operable to optimize the drive for these Magnus-type rotors, for example, depending on control input provided by a user.

In accordance with a specific embodiment of the present disclosure, the drive arrangement may be operable to apply the drive to rotate the Magnus-type rotors in order to render the Magnus-type rotors at least partially invisible to the one or more apparent wind speeds by adjusting their respective rates of rotations, such that their surface-to-flow velocity ratio is substantially unity.

Apart from the Magnus-type rotors 102, the control arrangement 106 may also be operable to control the propellers 116 for propelling the aquatic vessel. In some cases, the aquatic vessel may be propelled primarily by the propellers 116. In some cases, the aquatic vessel may be propelled primarily by the Magnus-type rotors 102. In other cases, the aquatic vessel may be propelled by thrusts generated by the propellers 116 and the Magnus-type rotors 102.

Moreover, the control arrangement 106 is operable to control the rudder 114 for manoeuvring the aquatic vessel during a course of travel of the aquatic vessel.

The rudder 114 and the propellers 116 may, for example, be spatially positioned at the stern of the aquatic vessel.

Apart from the rudder 114, the propulsion system 100 may also include one or more thrusters (not shown in FIG. 1). Accordingly, the control arrangement 106 may be operable to control the thrusters for manoeuvring the aquatic vessel. These thrusters may, for example, be built into or mounted to the bow and/or the stern of the aquatic vessel.

Moreover, the control arrangement 106 is also coupled with the control panel 110. For example, the control arrangement 106 may be coupled with the control panel 110 using NMEA standards.

The control arrangement 106 may be configured to communicate with the control panel 110, which may, for example, be operable to provide the control arrangement 106 with future route information for the aquatic vessel. The future route information may, for example, include detailed navigation instructions including one or more proposed routes that may be used by the aquatic vessel to reach its destination and/or one or more proposed vessel speeds to be used along the proposed routes.

Additionally, the control panel 110 may be used by a crew of the aquatic vessel to control and/or monitor various operations of the aquatic vessel, for example, including certain operations performed by the propulsion system 100. Beneficially, the control panel 110 may be spatially positioned in a bridge of the aquatic vessel from where the crew of the aquatic vessel may conveniently provide inputs to or receive outputs from the control arrangement 106. For example, the control panel 110 may provide the user with current information pertaining to the aquatic vessel and/or the propulsion system 100, such as a route taken by the aquatic vessel, the vessel location, the vessel speed, the vessel direction, and/or a total power consumed by the propulsion system 100.

Moreover, the control arrangement 106 may be communicably coupled with one or more external systems, for example, via the communication interface 112. In some cases, the communication interface 112 may be provided to the control arrangement 106 via the control panel 110. The communication interface 112 may, for example, employ satellite communication or other suitable wireless communication to communicably couple the control arrangement 106 with the external systems, which may be spatially located on a shore or other aquatic vessels stationed in an ocean.

In one example, one of the external systems may be a weather forecast system, which may be operable to provide the control arrangement 106 with weather forecast information for use in controlling the drive arrangement 104. The weather forecast information may include, inter alia, one or more forecasted wind speeds and one or more forecasted wind directions.

Optionally, the weather forecast system may be provided by the control arrangement 106 with information indicative of actual weather conditions faced by the aquatic vessel. Such information may be used by the weather forecast system, for example, for statistical analysis and/or for improving on weather forecast models used by the weather forecast system.

In another example, one of the external systems may be a data analysis system, which may be provided by the control arrangement 106 with information indicative of one or more analysis parameters including at least one of: the power consumption and/or the fuel consumption of the propulsion system 100. Based on these analysis parameters, the data analysis system may then be operable to compare the aquatic vessel with other aquatic vessels of comparable size. Optionally, the data analysis system may be operable to provide the control arrangement 106 with results of the comparison for use in determining an efficiency of the propulsion system 100.

In yet another example, one of the external systems may be a service management system to which the control arrangement 106 may send requests for one or more services provided by the service management system. For example, the service management system may be operable to send a rescue team in case of an emergency.

Moreover, the control arrangement 106 includes a user-operable control (not shown in FIG. 1) for adjusting propulsion provided by the Magnus-type rotors 102 and/or the propulsion system 100. The user-operable control enables a user to control and/or monitor various operations of the control arrangement 106.

For example, the user-operable control may enable the user to adjust at least one of: the rates of rotations of the Magnus-type rotors 102, the directions of rotations of the Magnus-type rotors 102, the drive applied to rotate the Magnus-type rotors 102, and/or angular accelerations and/or decelerations of the Magnus-type rotors 102. Details of the user-operable control have been provided in conjunction with FIGS. 2A, 2B, 2C and 2D.

Beneficially, the user-operable control may be integrated with the control panel 110. Alternatively, the user-operable control may be implemented entirely separate from the control panel 110.

FIG. 1 is merely an example, which should not unduly limit the scope of the claims herein. It is to be understood that the specific designation for the propulsion system 100 is for the convenience of reader and is not to be construed as limiting the propulsion system 100 to specific numbers, types, or arrangements of the Magnus-type rotors 102 and/or other components of the propulsion system 100. One of ordinary skill in the art would recognize many variations, alternatives, and modifications of embodiments of the present disclosure.

Figure 2A:
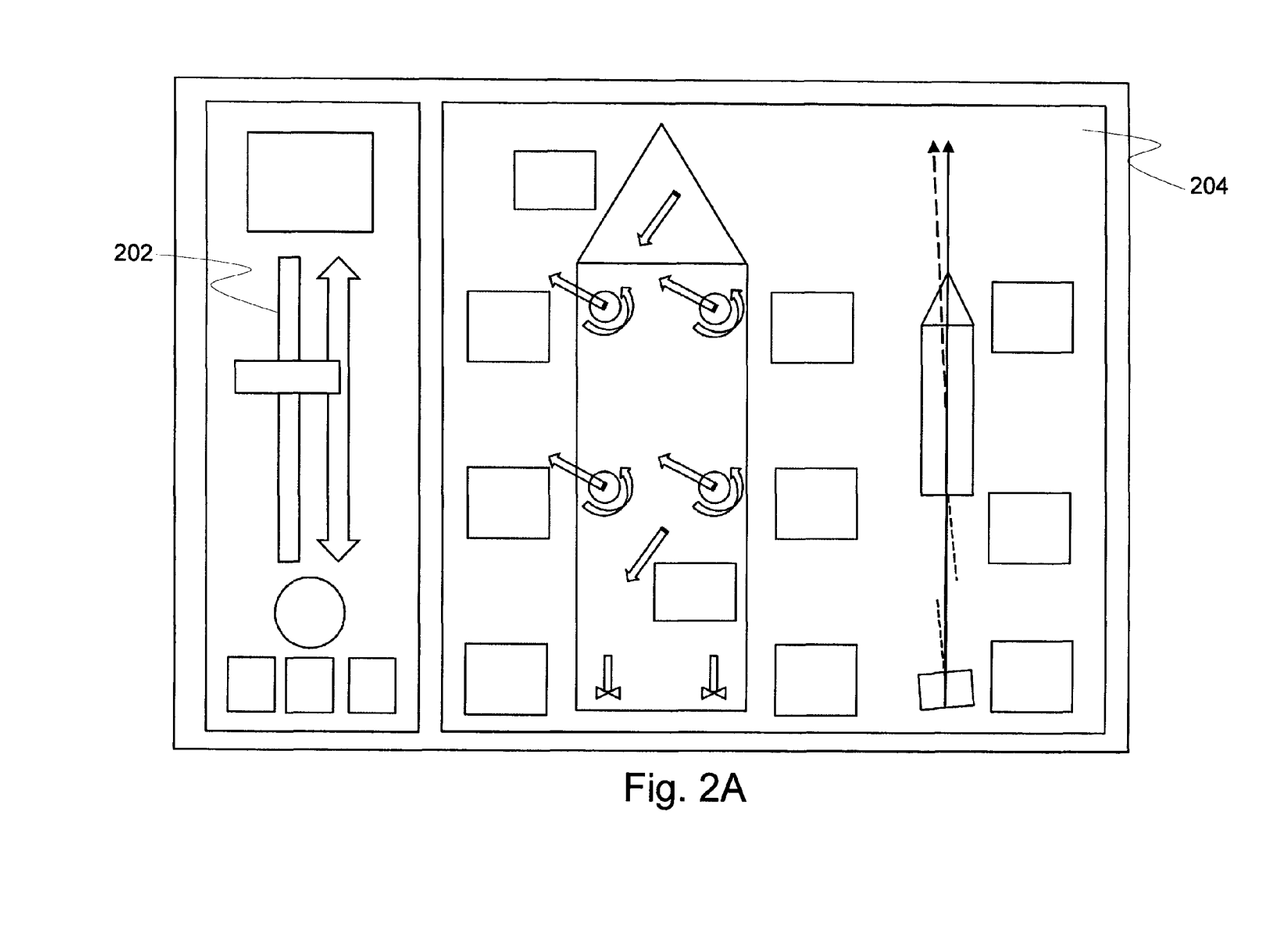
FIGS. 2A, 2B, 2C and 2D are schematic illustrations of a user-operable control suitable for controlling the propulsion system, in accordance with an embodiment of the present disclosure.
Figure 2B:
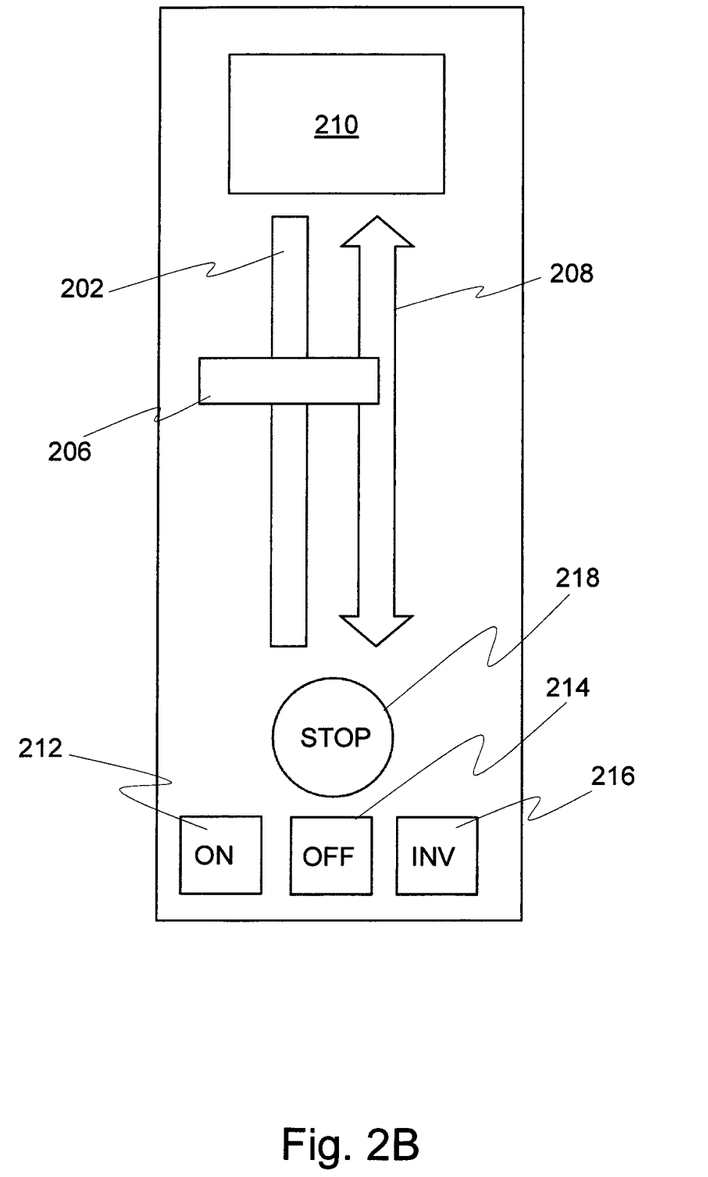
Figure 2C:
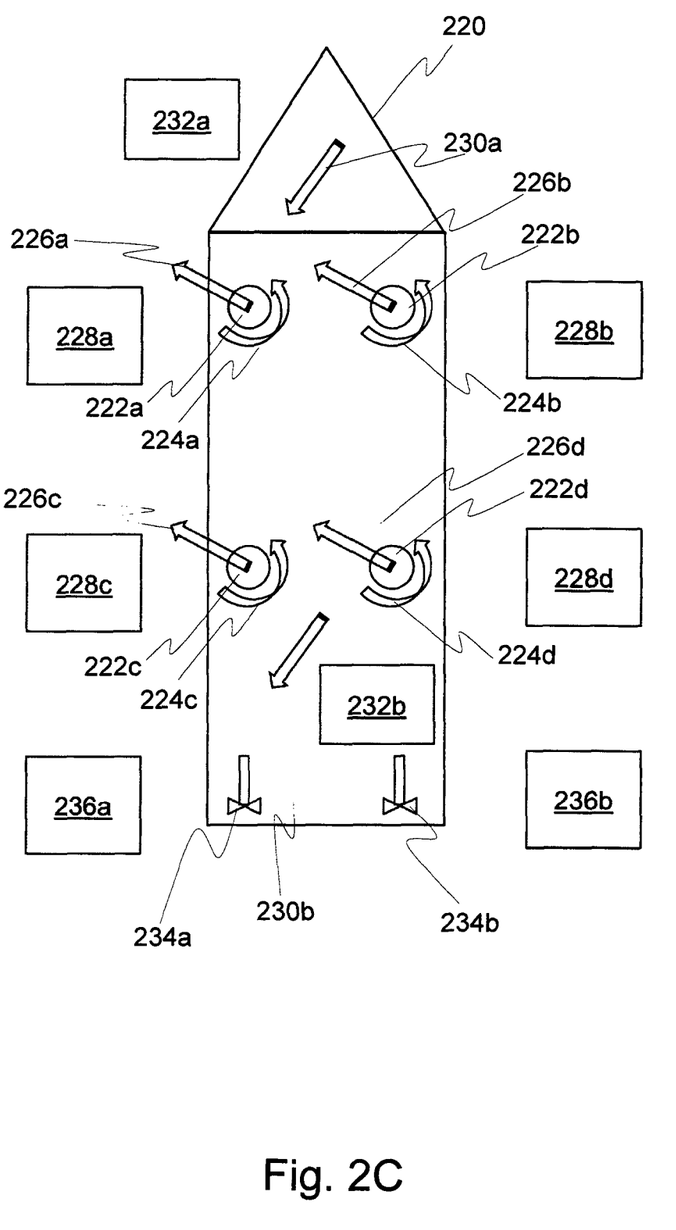
Figure 2D:
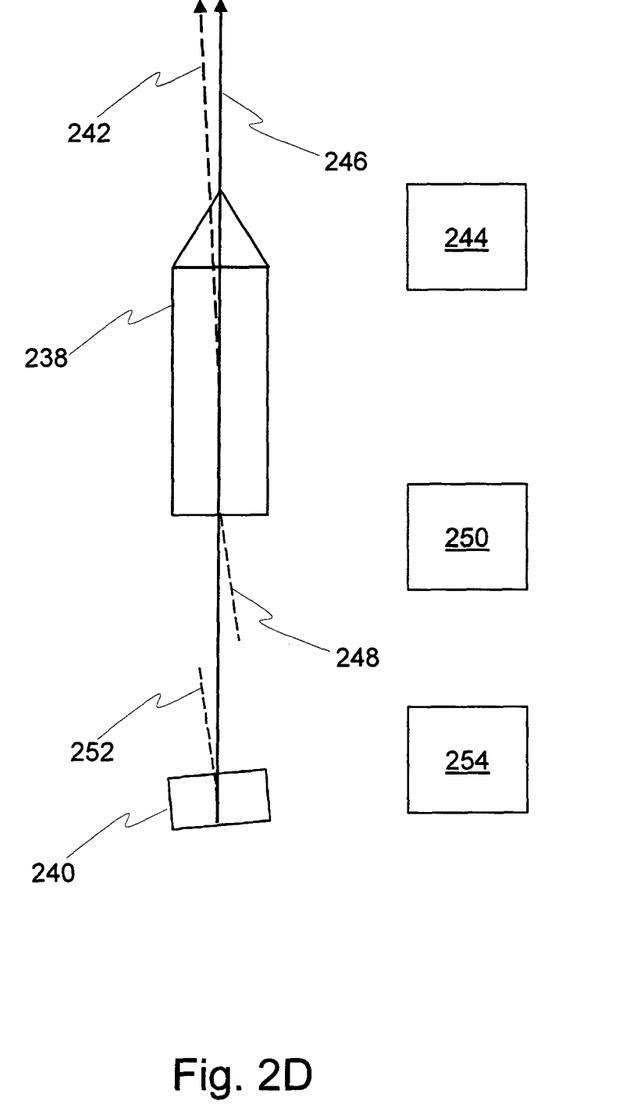

FIG. 2A is a schematic illustration of a user-operable control 200 suitable for controlling the propulsion system 100, while FIGS. 2B, 2C and 2D are schematic illustrations of various portions of the user-operable control 200, in accordance with an embodiment of the present disclosure. The user-operable control 200 may be included in the control arrangement 106. Alternatively, the user-operable control 200 may be integrated with the control panel 110.

The user-operable control 200 may be implemented via a GUI provided on one or more pixel displays of the control arrangement 106. Beneficially, at least one pixel display from these pixel displays may be implemented as at least one touch-screen display.

Additionally, the GUI or a part of the GUI may be implemented via a portable device that may be communicably coupled with the control arrangement 106. Beneficially, the portable device may include at least one touch-screen display and/or physical buttons. Examples of the portable device include, but are not limited to, a mobile terminal, a mobile telephone, a smart phone, a Mobile Internet Device (MID), a phablet computer, a tablet computer, a UMPC, a Personal Digital Assistant (PDA), a web pad, a handheld PC, and a laptop computer.

The user-operable control 200 includes a throttle control 202 and a touch-screen display 204, as shown in FIG. 2A. The throttle control 202 may be a physical throttle. Alternatively, the throttle control 202 may be a virtual throttle implemented on the touch-screen display 204 or another touch-screen display of the user-operable control 200.

The throttle control 202 includes a throttle lever 206, as shown in FIG. 2B. In case of a physical throttle, the throttle lever 206 may be pushed up or pulled down along a substantially vertical direction by a user to execute its functions, as depicted by a two-way arrow 208. In case of a virtual throttle, the throttle lever 206 may be slid up or down along a substantially vertical direction by the user to execute its functions, as depicted by the two-way arrow 208. Accordingly, the user-operable control 200 may be operable to receive its control input via one or more swiping gestures of the user.

The throttle control 202 may be operated by the user to control and/or allocate a total propulsion power demand from the Magnus-type rotors 102. A position of the throttle lever 206 in the throttle control 202 defines the total propulsion power demand from the Magnus-type rotors 102. In order to fulfil the total propulsion power demand, control inputs provided by the user via the throttle control 202 may be used by the control arrangement 106 to compute the rates of rotations to be adjusted for the Magnus-type rotors 102 individually.

While operating the throttle control 202, the user may take into consideration one or more predefined throttle parameters. Beneficially, current values of these predefined throttle parameters may be displayed on a portion 210 of the throttle control 202. The portion 210 may, for example, be one of the pixel displays of the user-operable control 200.

The predefined throttle parameters may include at least one of:
(a) a total propulsion power generated by the Magnus-type rotors 102,
(b) the total power consumed by the drive arrangement 104 to rotate the Magnus-type rotors 102, and/or
(c) the total propulsion power demand from the Magnus-type rotors 102.

The predefined throttle parameters may be either user-defined or system-defined by default.

Beneficially, the total propulsion power generated by the Magnus-type rotors 102 may also be displayed as a percentage of a total power produced by the propulsion system 100.

Apart from the throttle control 202, the user-operable control 200 may also include a button control. The button control includes one or more buttons, depicted as an ON button 212, an OFF button 214, an INVISIBLE or IDLE button 216 and a STOP button 218 in FIG. 2B. Optionally, these buttons may be virtual buttons that may be implemented on the touch-screen display 204 or another touch-screen display of the user-operable control 200, and may be activated when touched by the user. Alternatively, these buttons may be physical buttons that may be activated when pushed by the user.

The ON button 212 may be used by the user to start the Magnus-type rotors 102. The Magnus-type rotors 102 may be started, for example, when the throttle lever 206 is at its start position, that is, when the total power consumed by the drive arrangement 104 to rotate the Magnus-type rotors 102 is zero.

The OFF button 214 may be used by the user to shut down the Magnus-type rotors 102 gradually. The OFF button 214 may be configured to cut off a power supply to the drive arrangement 104, when activated by the user. Consequently, the Magnus-type rotors 102 may decelerate till they come to a halt. The Magnus-type rotors 102 may then be locked either manually or automatically.

The Magnus-type rotors 102 may be shut down, for example, after the throttle lever 206 is pulled down to its start position, that is, when the total power consumed by the drive arrangement 104 to rotate the Magnus-type rotors 102 is zero.

Optionally, when the Magnus-type rotors 102 decelerate during shut down, a momentum of rotations of the Magnus-type rotors 102 may be used to regenerate power. The power so regenerated may then be used to recharge the energy storage arrangement coupled to the electric grid.

The INVISIBLE or IDLE button 216 may be used by the user to render the Magnus-type rotors 102 at least partially invisible to the apparent wind conditions and/or to prevent false brinneling of the bearings and/or to prevent vortex shedding of the stationary Magnus-type rotor. The INVISIBLE or IDLE button 216 may be configured to adjust the rates of rotations of the Magnus-type rotors 102, such that their surface-to-flow velocity ratio is substantially unity.

The Magnus-type rotors 102 may be rendered at least partially invisible to the apparent wind conditions, so as to minimize a drag acting against the Magnus-type rotors 102, based on the "Barkley phenomena". In one example, the Magnus-type rotors 102 may be rendered at least partially invisible to the apparent wind conditions, when propelling the aquatic vessel against the wind. In another example, the Magnus-type rotors 102 may be rendered at least partially invisible to the apparent wind conditions, during manoeuvring of the aquatic vessel within a narrow region, such as a harbour, a shipyard, a river, a canal or the like. In another example, the Magnus-type rotors 102 may be rendered at least partially invisible to the apparent wind conditions to prevent false brinneling of the bearings of the Magnus-type rotor, which can occur when the Magnus-type rotor is constantly in a stationary position and exposed to vibrations and forces caused by the moving vessel. In another example, the Magnus-type rotors 102 may be rendered at least partially invisible to the apparent wind conditions to prevent vortex shedding of the Magnus-type rotor, which can occur in certain wind conditions when the Magnus-type rotor is in a stationary position and exposed to wind.

The STOP button 218 may be used by the user to shut down the Magnus-type rotors 102 as quickly as possible. The Magnus-type rotors 102 may be shut down quickly, for example, in case of an emergency. Once shut down, the Magnus-type rotors 102 may be locked either manually or automatically.

Optionally, the STOP button 218 may be activated by a single touch of the user. Beneficially, in order to avoid accidental activation of the STOP button 218, a confirmation may be requested from the user. In such a case, the STOP button 218 may be activated only after receiving the confirmation from the user. In one example, the confirmation may be received via a confirmation dialogbox displayed on the GUI of the user-operable control 200. In another example, the confirmation may be received via a predefined gesture made by the user immediately before or after touching the STOP button 218. The predefined gesture may, for example, be swiping from left to right or making a cross on the touch-screen display 204 or another touch-screen display of the user-operable control 200.

In this manner, the throttle control 202 and the button control enables the user to control the Magnus-type rotors 102, as and when required.

Furthermore, portions of the touch-screen display 204 have been depicted in FIGS. 2C and 2D, for illustration purposes. The touch-screen display 204 may be used to display current values of one or more of the sensor parameters measured by the sensors 108. Beneficially, the touch-screen display 204 may display a schematic diagram 220 of the aquatic vessel, and display the current values of the one or more of the sensor parameters with the schematic diagram 220.

In FIG. 2C, circles 222a, 222b, 222c and 222d within the schematic diagram 220 depict the Magnus-type rotors 102a, 102b, 102c and 102d, respectively. The circles 222a, 222b, 222c and 222d also depict relative spatial positions of the Magnus-type rotors 102a, 102b, 102c and 102d on the deck of the aquatic vessel.

Circular arrows 224a, 224b, 224c and 224d depict the directions of rotations of the Magnus-type rotors 102a, 102b, 102c and 102d, respectively. Straight arrows 226a, 226b, 226c and 226d depict directions of thrusts generated by the Magnus-type rotors 102a, 102b, 102c and 102d, respectively.

Additionally, the touch-screen display 204 may be used to display current values of the rates of rotations of the Magnus-type rotors 102, the power consumed by the drive arrangement 104 to rotate the Magnus-type rotors 102, and/or the propulsion power generated by the Magnus-type rotors 102. The current values of the rates of rotations, the power consumed and/or the propulsion power generated may be displayed separately and individually for the Magnus-type rotors 102a, 102b, 102c and 102d, on portions 228a, 228b, 228c and 228d of the touch-screen display 204, respectively. The portions 228a, 228b, 228c and 228d may also display the rates of rotations to be adjusted for the Magnus-type rotors 102a, 102b, 102c and 102d, respectively.

Optionally, the touch-screen display 204 may be used to display information about status of the Magnus-type rotors 102 and/or problems diagnosed in the propulsion system 100 to notify the user.

Additionally, the user may be allowed to control each of the Magnus-type rotors 102 individually via the user-operable control 200. Accordingly, the user-operable control 200 may be operable to receive its control input via one or more circular gestures of the user. For example, the rates of rotations of the Magnus-type rotors 102 may be increased or decreased based on the circular gestures of the user in anti-clockwise or clockwise directions. Such circular gestures may be performed with one or more fingers or pointing devices on the touch-screen display 204.

Furthermore, a straight arrow 230a depicts the wind direction in a local proximity of the Magnus-type rotors 102a and 102b, while a straight arrow 230b depicts the wind direction in a local proximity of the Magnus-type rotors 102c and 102d.

Additionally, current values of the measured apparent wind speeds and/or the wind speeds, and the measured apparent wind directions and/or the wind directions may be displayed on portions 232a and 232b of the touch-screen display 204. Optionally, current values of an average apparent wind speed and an average apparent wind direction may also be displayed on a portion of the touch-screen display 204.

Moreover, symbols 234a and 234b within the schematic diagram 220 depict the propellers 116a and 116b, respectively. The symbols 234a and 234b also depict relative spatial positions of the propellers 116a and 116b on the stern of the aquatic vessel.

Additionally, current values of power consumed by the propellers 116a and 116b and/or the propulsion power generated by the propellers 116a and 116b may be displayed separately and individually, on portions 236a and 236b of the touch-screen display 204, respectively. Beneficially, the propulsion power generated by the propellers 116a and 116b may also be displayed as a percentage of the total power produced by the propulsion system 100.

Additionally, the user-operable control 200 may enable the user to allocate a target propulsion power for the propellers 116.

Furthermore, in FIG. 2D, a top view 238 and a back view 240 of the aquatic vessel has been shown for illustration purposes. A dashed arrow 242 depicts a current direction of travel of the aquatic vessel.

Additionally, current values of the vessel speed and the vessel direction may be displayed on a portion 244 of the touch-screen display 204.

An arrow 246 depicts a heading of the aquatic vessel. The heading of the aquatic vessel may be defined as a direction in which the aquatic vessel's hull is headed. The arrow 246 depicts a longitudinal axis of the aquatic vessel.

The heading of the aquatic vessel may be controlled by adjusting a rudder angle of the rudder 114. The rudder angle may be defined as an acute angle between a position of the rudder 114 and the longitudinal axis of the aquatic vessel. In FIG. 2D, a dashed line 248 depicts a current position of the rudder 114 with respect to the longitudinal axis of the aquatic vessel.

Additionally, current values of the heading and/or the rudder angle may be displayed on a portion 250 of the touch-screen display 204. The portion 250 may also display a suitable rudder angle determined by the control arrangement 106 to balance the aquatic vessel.

In order to determine the suitable rudder angle for the rudder 114, the control arrangement 106 may take into account a leeway and/or a heel of the aquatic vessel. The leeway may be defined as a leeward drift of the aquatic vessel caused by wind blowing against windward surfaces of the aquatic vessel. The heel may be defined as a temporary inclination of the aquatic vessel in motion. The heel may be caused when the aquatic vessel turns and/or by the wind blowing against the windward surfaces. In FIG. 2D, a dashed line 252 depicts a current heel of the aquatic vessel.

Beneficially, information pertaining to the leeway and/or the heel of the aquatic vessel may be displayed on a portion 254 of the touch-screen display 204.

In this manner, the user-operable control 200 enables the user to control and/or monitor various operations of the control arrangement 106 in an effective manner. Beneficially, the user-operable control 200 provides all important controls, including the throttle control 202, the button control and the touch-screen display 204, in a single place.

Moreover, the user-operable control 200 provides feedback to the user so as to help the user in making operational decisions.

Moreover, the user-operable control 200 is simple-to-use and allows the user to control complex operations of various components of the propulsion system 100 with ease. Beneficially, even an untrained user may be able to operate the user-operable control 200.

FIGS. 2A, 2B, 2C and 2D are merely examples, which should not unduly limit the scope of the claims herein. It is to be understood that the specific designation for the user-operable control 200 is for the convenience of reader and is not to be construed as limiting the user-operable control 200 to specific numbers, types, or arrangements of components of the user-operable control 200. One of ordinary skill in the art would recognize many variations, alternatives, and modifications of embodiments of the present disclosure.

Figure 3:
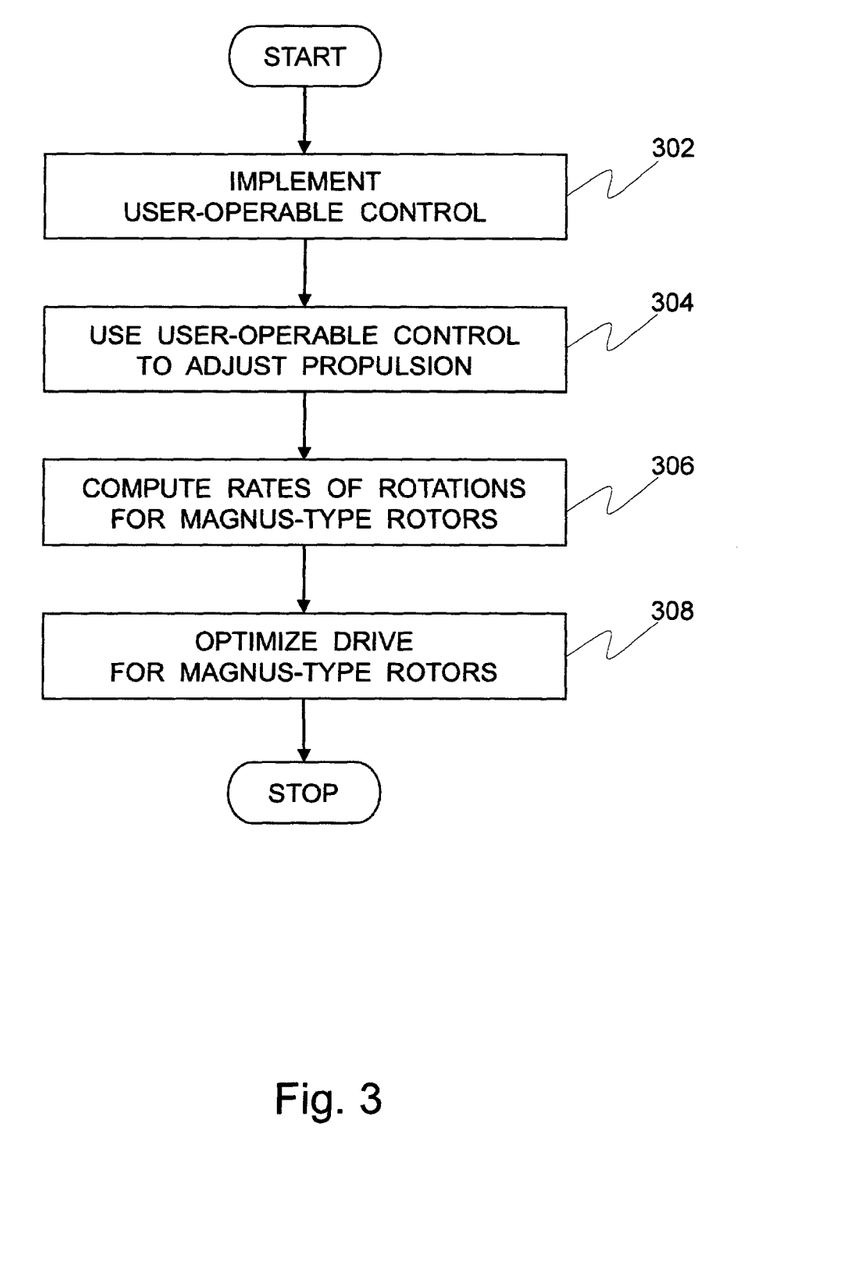
FIG. 3 is an illustration of steps of a method of controlling the propulsion system, in accordance with an embodiment of the present disclosure.

FIG. 3 is an illustration of steps of a method of controlling the propulsion system 100, in accordance with an embodiment of the present disclosure. The method is depicted as a collection of steps in a logical flow diagram, which represents a sequence of steps that can be implemented in hardware, software, or a combination thereof.

At a step 302, the user-operable control 200 is implemented via a GUI provided on one or more pixel displays of the control arrangement 106. In accordance with the step 302, at least one of the pixel displays may be implemented as at least one touch-screen display, for example, such as the touch-screen display 204.

Beneficially, the user-operable control 200 may be implemented as a single throttle control, such as the throttle control 202, and/or a button control, as described earlier.

At a step 304, the user uses the user-operable control 200 for adjusting propulsion provided by the Magnus-type rotors 102.

In accordance with the step 304, the user may operate the throttle control 202 to control and/or allocate the total propulsion power demand from the Magnus-type rotors 102, as described earlier.

Beneficially, the user-operable control 200 may be arranged to receive its control input via one or more swiping gestures of the user. Additionally, the user-operable control 200 may be arranged to receive its control input via one or more circular gestures of the user.

Next, at a step 306, the control arrangement 106 computes the rates of rotations to be adjusted for the Magnus-type rotors 102 individually, based on the control input received by the user-operable control 200.

Subsequently, at a step 308, the control arrangement 106 optimizes the drive applied by the drive arrangement 104 to rotate the Magnus-type rotors 102 individually.

Let us consider, for example, that the user activated the INVISIBLE or IDLE button 216 at the step 304. Accordingly, at the step 306, the control arrangement 106 may compute the rates of rotations to be adjusted for the Magnus-type rotors 102, such that their surface-to-flow velocity ratio is substantially unity. The surface-to-flow velocity ratio may, for example, be adjusted in a range of 0.3 to 1.5. Subsequently, at the step 308, the control arrangement 106 may optimize the drive applied by the drive arrangement 104, so as to render the Magnus-type rotors 102 at least partially invisible to the apparent wind conditions.

It should be noted here that the steps 302 to 308 are only illustrative and other alternatives can also be provided where one or more steps are added, one or more steps are removed, or one or more steps are provided in a different sequence without departing from the scope of the claims herein.

Embodiments of the present disclosure can be used for various purposes, including, though not limited to, enabling the user to control and/or monitor various operations of the control arrangement 106 in an effective manner, and allowing the user to control complex operations of various components of the propulsion system 100 with ease, such that even an untrained user may be able to operate the user-operable control 200.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

I claim:

1. A propulsion system for an aquatic vessel, wherein the propulsion system includes a plurality of Magnus-type rotors that are operable to rotate about corresponding substantially upright axes, a drive arrangement for rotating the plurality of Magnus-type rotors, and a control arrangement for receiving one or more measured apparent wind speeds and for controlling the drive arrangement for varying rates of rotations of the plurality of Magnus-type rotors as functions of the one or more measured apparent wind speeds and a direction of travel of the aquatic vessel, wherein the control arrangement includes a user-operable control for adjusting propulsion provided by the plurality of Magnus-type rotors, wherein the user-operable control is implemented as a single throttle control that enables a user to control and/or allocate a total propulsion power demand from the plurality of Magnus-type rotors, further wherein the control arrangement is operable to control the drive arrangement to vary a drive applied to rotate one or more Magnus-type rotors from the plurality of Magnus-type rotors, and the control arrangement is operable to optimize the drive for the one or more Magnus-type rotors depending on a control input provided by the user via the single throttle control; and wherein the drive arrangement is configured to apply the drive to rotate the one or more Magnus-type rotors to render the one or more Magnus-type rotors at least partially invisible to the one or more apparent wind speeds by adjusting their respective rates of rotations, such that their surface-to-flow velocity ratio is adjusted in a range of 0.3 to 1.5.

2. The propulsion system as claimed in claim 1, wherein the user-operable control is implemented via a graphical user interface provided on one or more pixel displays.

3. The propulsion system as claimed in claim 2, wherein at least one pixel display from the one or more pixel displays is implemented as at least one touch-screen display.

4. The propulsion system as claimed in claim 3, wherein the user-operable control is operable to receive one or more control inputs via one or more circular gestures of the user on the at least one touch-screen display, thereby enabling the user to control each of the plurality of Magnus-type rotors individually.

5. The propulsion system as claimed in claim 1, wherein the user-operable control is operable to receive the control input via one or more swiping gestures of the user.

6. The propulsion system as claimed in claim 1, wherein the control arrangement is operable to compute rates of rotations to be adjusted for the plurality of Magnus-type rotors individually, based on the total propulsion power demand from the plurality of Magnus-type rotors and one or more apparent wind speeds in proximities of the plurality of Magnus-type rotors.

7. A method of controlling a propulsion system for an aquatic vessel, wherein the propulsion system includes a plurality of Magnus-type rotors that are operable to rotate about corresponding substantially upright axes, a drive arrangement for rotating the plurality of Magnus-type rotors, and a control arrangement for receiving one or more measured apparent wind speeds and for controlling the drive arrangement for varying rates of rotations of the plurality of Magnus-type rotors as functions of the one or more measured apparent wind speeds and a direction of travel of the aquatic vessel, wherein the method includes:

using a user-operable control of the control arrangement for adjusting propulsion provided by the plurality of Magnus-type rotors, wherein the user-operable control is implemented as a single throttle control that enables a user to control and/or allocate a total propulsion power demand from the plurality of Magnus-type rotors;

operating the control arrangement to control the drive arrangement to vary a drive applied to rotate one or more Magnus-type rotors from the plurality of Magnus-type rotors;

operating the control arrangement to optimize the drive for the one or more Magnus-type rotors depending on a control input provided by the user via the single throttle control; and operating the drive arrangement to apply the drive to rotate the one or more Magnus-type rotors to render the one or more Magnus-type rotors at least partially invisible to the one or more apparent wind speeds by adjusting their respective rates of rotations, such that their surface-to-flow velocity ratio is adjusted in a range of 0.3 to 1.5.

8. The method as claimed in claim 7, wherein the method includes implementing the user-operable control via a graphical user interface provided on one or more pixel displays.

9. The method as claimed in claim 8, wherein the method includes implementing at least one pixel display from the one or more pixel displays as at least one touch-screen display.

10. The method as claimed in claim 9, wherein the method includes arranging for the user-operable control to receive one or more control inputs via one or more circular gestures of the user on the at least one touch-screen display, thereby enabling the user to control each of the plurality of Magnus-type rotors individually.

11. The method as claimed in claim 7, wherein the method includes arranging for the user-operable control to receive the control input via to receive the control input via one or more swiping gestures of the user and optionally operating the control arrangement to compute rates of rotations to be adjusted for the plurality of Magnus-type rotors individually, based on the total propulsion power demand from the plurality of Magnus-type rotors and one or more apparent wind speeds in proximities of the plurality of Magnus-type rotors.

12. The method as claimed in claim 7, wherein the method includes operating the drive arrangement to apply the drive to rotate the one or more Magnus-type rotors to prevent wear of the bearings of the Magnus-type rotor due to false brinneling by adjusting their respective rates of rotations, such that their surface-to-flow velocity ratio is 0.00001-1.5, or vortex shedding phenomena on the stationary rotor by adjusting their respective rates of rotations, such that their surface-to-flow velocity ratio is 0.5 to 1.5.

13. A software product recorded on non-transitory machine-readable data storage media, wherein the software product is executable upon computing hardware for implementing the method as claimed in claim 7.

* * * * *